April 23, 1935.  R. F. EDGAR ET AL  1,998,952
RAIL INSPECTION APPARATUS
Filed March 15, 1934
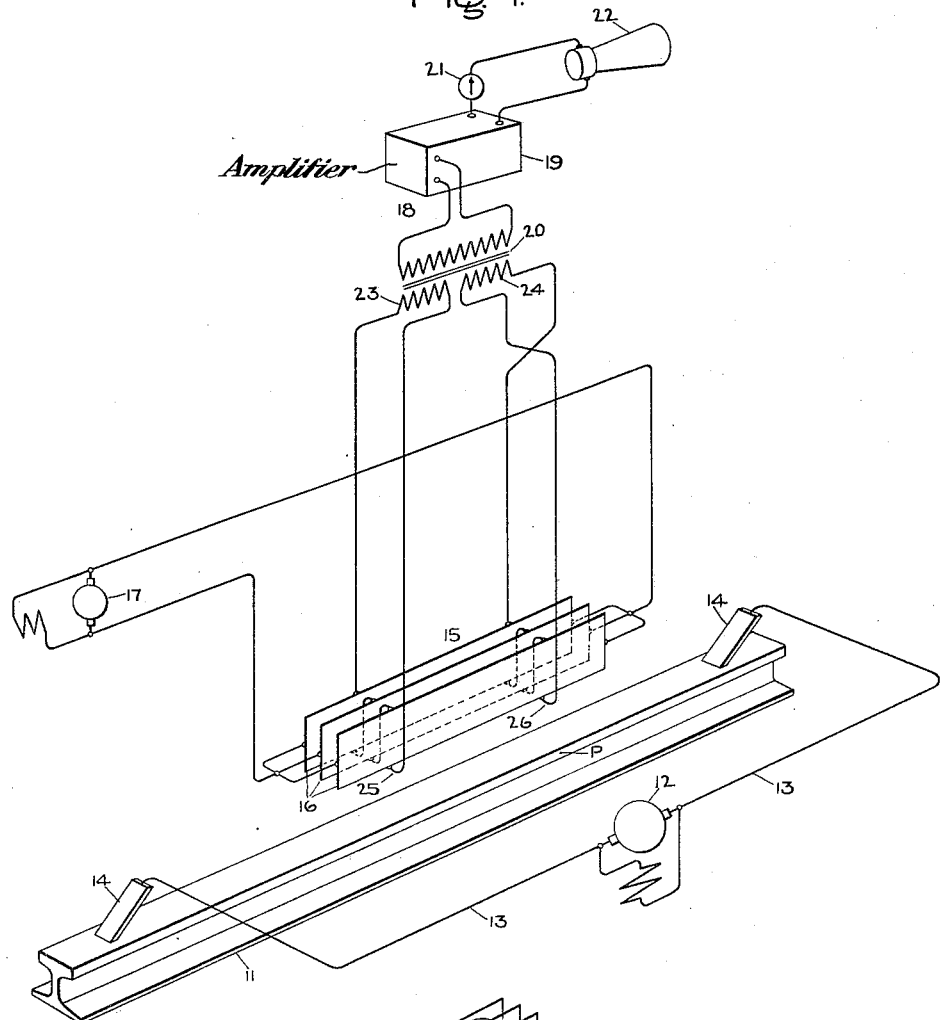
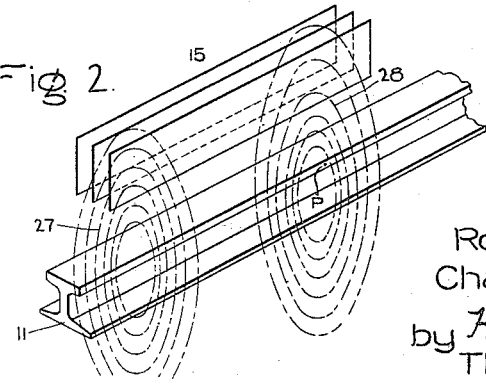
Inventors:
Robert F. Edgar,
Charles Concordia,
by Harry E. Dunham
Their Attorney.

Patented Apr. 23, 1935

1,998,952

UNITED STATES PATENT OFFICE 1,998,952

RAIL INSPECTION APPARATUS

Robert F. Edgar and Charles Concordia, Schenectady, N. Y., assignors to General Electric Company, a corporation of New York Application March 15, 1934, Serial No. 715,635

9 Claims. (Cl. 175—183)

Our invention relates to magnetic testing devices and methods and concerns particularly arrangements employing the Hall effect.

It is an object of our invention to provide improved, simply constructed, easily operated, apparatus for detecting flaws or defects in material to be tested. Other and further objects and advantages will become apparent as the description proceeds.

Our invention utilizes a phenomenon known as the Hall effect whereby, when a current is passed longitudinally through a strip or sheet composed of certain substances such as tellurium, for example, and the strip is subjected to a transverse magnetic field, a potential difference occurs between points in the strip on a line perpendicular to the directions of said current and said magnetic field. In accordance with our invention in its preferred form, a current is caused to flow through an object to be tested or inspected, thereby setting up a magnetic field, and one or more strips of a substance exhibiting the Hall effect through which a current is also caused to flow are held adjacent to or carried along the test object. Cracks, fissures, and other flaws or defects in the test object result in irregularities in the current path through it so that the magnetic field induced by this current becomes non-uniform along the length of the test object. In consequence, variations occur in the potential differences induced across said Hall effect strips for different positions along the test object and indications of the faults are obtained.

The features of our invention which we believe to be novel and patentable will be pointed out in the claims appended hereto. A better understanding of our invention, itself, however may be obtained by referring to the following description taken in connection with the accompanying drawing in which Fig. 1 schematically illustrates in perspective one embodiment of our invention, and Fig. 2 illustrates in part the embodiment of Fig. 1, showing the magnetic field set up.

Referring now more in detail to the drawing, we have illustrated the application of our invention to the magnetic inspection of continuous bars such as rails, for example, but it will be understood that our invention is not limited thereto. A magnetic field is set up in or about the test piece in some suitable manner as, for example, by means of a magnet with pole pieces in proximity to the test piece, by means of a current conducting winding surrounding the test piece or, if desired, a current may be passed through the test piece itself. For instance, an alternating or direct current may be passed through the section of a rail 11 being inspected by means of a suitable generator 12 having leads 13 making contact with the rail 11 in any suitable manner as by means of brushes 14. A detecting element 15 is held or carried along the rail 11 by suitable means not shown.

The detecting element 15 consists of one or more strips 16 of a substance such as tellurium exhibiting the Hall effect with connections at the ends to a current source 17 and connections at the edges to a voltage responsive device 18. The strips 16 may, if desired, consist of tellurium sheets or foil cemented together with a suitable insulating binder but any other desired construction may also be employed. Although the element tellurium appears to exhibit the Hall effect in the most marked degree, this property is also exhibited by other substances, particulary by the elements and alloys of elements falling in the same chemical families as tellurium and bismuth in the periodic arrangement of the elements.

The current source 17 is so connected to the ends of the strips 16 that current flows longitudinally in the same direction in all the strips 16 at any given instant. Obviously, the strips 16 may be connected either in series or in parallel although the parallel connection is here shown for the sake of illustration. The voltage responsive device 18 may take any desired form but is here shown as comprising an amplifier 19 of any desired type such as a vacuum tube amplifier connected to the edges of the strips 16 through a transformer 20 and a current responsive device, such as an indicating instrument 21 or a loud speaker 22 energized by the amplifier 19.

For the sake of greater sensitivity, the connections to the edges of the strips 16 are preferably such that the strips are in series with respect to either of the primary windings 23 or 24 of the transformer 20 but it will be understood that our invention is not limited to this arrangement. When it is desired to employ the Nul method of testing the object 11, two sets of connections 25 and 26 are made at the edges of the strips 16 near opposite ends of the strips and these connections are joined to windings 23 and 24 respectively. The polarities of the windings 23 and 24 are such that voltages taken from the connections 25 and 26 oppose each other in the transformer 20 and tend to neutralize. Obviously, only one set of connections to the edges of strips 16 and one primary winding to transformer 20 will be required if it is desired to take direct readings instead of employing the Nul method.

The current sources 12 and 17 may be either alternating or direct current sources. If both sources supply direct current, the operation will be as follows: The current flowing through the rail 11 from source 12 will set up lines of magnetic induction surrounding the rail 11 and intersecting the sheets 16 perpendicularly, as indicated by the group of dotted lines 27 and 28 representing the shapes of the magnetic field in two different planes perpendicular to the rail 11. As long as the rail 11 is without a flaw, the current path will be straight and the magnetic field uniform. Consequently, equal and opposite voltages are induced at connections 25 and 26. Should, however, there be a flaw in the rail 11 at the point P, the current will be compelled to deviate from its normal path and the magnetic field around this part of the rail will be distorted. In the example illustrated, the flaw at P forces the current path lower in the rail, thereby depressing the lines of force 28 so that a portion of the field of less flux density acts upon the end 26 of the unit 15. When the portion 26 of the detecting unit 15 comes over the point P as the unit 15 is being carried along the rail, the two ends of the sheet 16 will be subject to magnetic fields of unequal strength and the voltage impressed on the primary winding 24 of transformer 20 will rise or fall in comparison with that of winding 23 so that an unbalanced voltage impulse will be induced in the secondary winding of transformer 20 which will be amplified by the amplifier 19 to produce a deflection of the instrument 21 or a blast from the loud speaker 22 to warn the operator of the flaw in the rail 11.

If either or both of the sources 12 or 17 supply alternating current, obviously alternating voltages will appear at the connections 25 or 26 and, in the case of a flaw in the rail 11, the voltages will become unbalanced, causing the transformer 20 to supply an alternating current to amplifier 19. The operation will be similar to that described for the direct current case except that the response of devices 21 or 22 will be continuous while the end 26 of the unit 15 remains over the point P and, if desired, the detecting unit 15 may be held stationary at any part of the rail 11 suspected of having a flaw instead of being carried progressively along the rail. Ordinarily, however, either the detecting unit 15 will be carried along the rail 11 or the bar, sheet, or rail to be tested will be passed continuously along the detector unit in order to complete inspection as rapidly as possible.

In accordance with the provisions of the patent statutes, we have described the principle of operation of our invention together with the apparatus which we now believe to represent the best embodiment thereof, but desire to have it understood that the apparatus shown and described is only illustrative and that our invention may be carried out by other arrangements.

What we claim as new and desire to secure by Letters Patent of the United States, is:

1. Magnetic test apparatus comprising means for passing an electrical current through a test piece, a member of material exhibiting the Hall effect adapted to be brought into proximity with said test piece, means for passing a current through said member, and means responsive to variations in the potential difference between points in said member on a line transverse to the current path therein to provide indications of non-uniformities in said test piece.

2. Magnetic test apparatus comprising in combination with a test piece means for passing an electrical current through the test piece, a member of material exhibiting the Hall effect adapted to be brought into proximity with said test piece, means for passing current through said member substantially parallel to the mean current path in said test piece and means responsive to variations in the difference in potential between points in said Hall effect member toward and away from said test piece to provide indication of non-uniformities in said test piece.

3. Magnetic test apparatus comprising means for passing an electrical current through a test piece, a sheet of material exhibiting the Hall effect adapted to be brought into proximity with said test piece in a plane directed toward said test piece, means for passing a current through said sheet, and means responsive to variations in the difference in potential between points in said sheet on a line transverse to the current path therein to provide an indication of non-uniformities in said test piece.

4. Magnetic test apparatus comprising means for passing an electrical current through a test piece, a sheet of material exhibiting the Hall effect adapted to be brought in proximity with said test piece in a plane directed toward said test piece and with its longitudinal axis substantially parallel with the mean current path in said test piece, means for passing a current through said sheet longitudinally, and means responsive to variations in the difference in potential between the edges of said sheet toward and away from said test piece to provide an indication of non-uniformities in said test piece.

5. Magnetic test apparatus comprising means for passing an electrical current longitudinally through a test piece, a sheet of magnetic material exhibiting the Hall effect adapted to be brought into proximity with said test piece in a plane directed toward said test piece and with its longitudinal axis substantially parallel with said test piece, means for passing a current through said test piece longitudinally, and means for comparing the difference in potential between the edges of said sheet at one end with the difference in potential betwen the edges at the other end to provide an indication of non-uniformities in said test piece between the points opposite the ends of said sheet.

6. Magnetic test apparatus comprising means for passing an electrical current through a test piece, a strip of tellurium adapted to be brought into proximity with said test piece, means for passing current through said tellurium strip, and means responsive to variations in the difference in potential between points in said tellurium strip along a line transverse to the current path therein to provide an indication of non-uniformities in said test piece.

7. A method of magnetically testing a specimen for flaws which comprises setting up a magnetic field in the space containing a portion, at least, of said specimen, bringing a member composed of material exhibiting the Hall effect into proximity with said specimen, passing a current through said Hall effect member, and determining the potential difference between points in said Hall effect member on a line transverse to the current path therein.

8. A method of magnetically testing a specimen for flaws which comprises setting up a magnetic field in the space containing a portion, at least, of said specimen, bringing a member composed of a material exhibiting the Hall effect into proximity with said specimen, passing a current through said Hall effect member, and comparing the potential difference between points in said Hall effect member on a line transverse to the current path therein and adjacent a given portion of said test specimen with the potential difference between points in said Hall effect member on a line transverse to the curernt path therein adjacent another portion of said specimen.

9. Magnetic test apparatus comprising means for setting up a magnetic field in space containing a portion, at least, of a test piece, a member of material exhibiting the Hall effect adapted to be brought into proximity with said test piece, means for passing a current through said member, and means responsive to variations in the potential difference between points in said member on a line transverse to the current path therein to provide indications of non-uniformities in said test piece.

ROBERT F. EDGAR.
CHARLES CONCORDIA.